United States Patent
Rogers (10) Patent No.: US 9,757,607 B2
(45) Date of Patent: Sep. 12, 2017

(54) WEIGHTLIFTING APPARATUS HAVING FREE WEIGHT MOTION AND A SAFETY MECHANISM

(71) Applicant: Rodney Rogers, Forestville, NY (US)

(72) Inventor: Rodney Rogers, Forestville, NY (US)

( * ) Notice: Subject to any disclaimer, the term of this patent is extended or adjusted under 35 U.S.C. 154(b) by 230 days.

(21) Appl. No.: 14/856,702

(22) Filed: Sep. 17, 2015

(65) Prior Publication Data

US 2017/0080277 A1   Mar. 23, 2017

(51) Int. Cl.
| | |
|---|---|
| *A63B 21/078* | (2006.01) |
| *A63B 21/072* | (2006.01) |
| *F16D 48/06* | (2006.01) |
| *A63B 24/00* | (2006.01) |
| *A63B 21/005* | (2006.01) |
| *A63B 21/00* | (2006.01) |

(52) U.S. Cl.
CPC ........ *A63B 21/0783* (2015.10); *A63B 21/078* (2013.01); *F16D 48/064* (2013.01); *A63B 21/0057* (2013.01); *A63B 21/00181* (2013.01); *A63B 21/0724* (2013.01); *A63B 21/151* (2013.01); *A63B 21/154* (2013.01); *A63B 21/4047* (2015.10); *A63B 24/0087* (2013.01); *A63B 2220/801* (2013.01)

(58) Field of Classification Search
CPC . A63B 21/0783; A63B 21/078; A63B 21/154; A63B 21/4047; A63B 21/00181; A63B 21/0057; A63B 21/151; A63B 2220/801; A63B 21/0724; A63B 24/0087; F16D 48/064
See application file for complete search history.

(56) References Cited

U.S. PATENT DOCUMENTS

| | | | |
|---|---|---|---|
| 5,151,071 A * | 9/1992 | Jain | A63B 21/0628 482/101 |
| 5,716,306 A * | 2/1998 | Gallay | A63B 21/078 24/134 P |
| 2002/0098953 A1* | 7/2002 | Scheewe | A63B 21/06 482/94 |
| 2004/0176224 A1* | 9/2004 | Slawinski | A63B 21/078 482/93 |
| 2006/0252609 A1* | 11/2006 | Abelbeck | A63B 21/078 482/92 |
| 2007/0203002 A1* | 8/2007 | Webber | A63B 21/078 482/104 |

(Continued)

*Primary Examiner* — Sundhara Ganesan (57) ABSTRACT

A weightlifting apparatus having free weight simulation and a safety mechanism includes at least one upright support having a bar engaging pulley assembly and a weight engaging pulley assembly. The upright support includes a universal joint for allowing the upright support to pivot. A lifting bar having an end movably coupled to the bar engaging pulley assembly is also included. The lifting bar includes a grip portion having switch contact disposed therein that is engaged when the grip portion is depressed. A clutch assembly is provided for enabling the bar engaging pulley assembly and weight engaging pulley assembly to move together in unison when a voltage is supplied by engaging the grip portion. Disengagement of the grip portion opens the switch contact and causes voltage to be cut off from the clutch assembly, thereby disengaging the weight support element and the lifting bar.

11 Claims, 11 Drawing Sheets

(56) References Cited

U.S. PATENT DOCUMENTS

2014/0128228 A1* 5/2014 Bonomi ............. A63B 21/0414
                                                   482/98
2014/0296040 A1* 10/2014 Mobley ................ A63B 21/078
                                                   482/104
2015/0306443 A1* 10/2015 Bruni, Jr. ............. A63B 21/078
                                                   482/104

* cited by examiner

WEIGHTLIFTING APPARATUS HAVING FREE WEIGHT MOTION AND A SAFETY MECHANISM

FIELD OF THE INVENTION

In general, the invention relates to a weightlifting apparatus and more particularly to weight lifting apparatus that simulates a free weight barbell while providing a safety mechanism that disengages the weight load when a user releases a grip on the lifting bar.

BRIEF SUMMARY

A weightlifting apparatus having free weight simulation and a safety mechanism includes at least one upright support having a bar engaging pulley assembly and a weight engaging pulley assembly. The upright support includes a universal joint for allowing the upright support to pivot about a base. The weightlifting apparatus also includes a lifting bar support element coupled to the lifting bar engaging pulley assembly. A lifting bar having an end coupled to the bar engaging pulley assembly is also included. The lifting bar includes a grip portion having switch contact disposed therein that is engaged when the grip portion is depressed. A bar end is coupled to the lifting bar support element with a spherical bearing that enables horizontal, vertical and rotational movement of the lifting bar.

The weightlifting apparatus also includes a weight support element coupled to the weight engaging pulley assembly, wherein the weight support element is adapted to hold weights. The weightlifting apparatus also includes a clutch assembly for enabling the bar engaging pulley assembly and a weight engaging pulley assembly to move together in unison when a voltage is supplied by engaging the grip portion. Disengagement of the grip portion opens the switch contact and causes voltage to be cut off from the clutch assembly, thereby uncoupling the lifting bar engaging pulley assembly and weight engaging pulley assembly and disengaging the weight support element and the lifting bar.

In one embodiment, the clutch assembly includes a clutch coil and a pair of clutch plates that contact to enable the bar engaging pulley assembly and weight engaging pulley assembly to move together in unison and separate to uncouple the lifting bar engaging pulley assembly and weight engaging pulley assembly, thereby disengaging the weight support element and the lifting bar. The weightlifting apparatus also includes a lifting bar guide rod and a weight support guide rod. The lifting bar support element is a bracket having a sleeve for fitting over lifting bar guide rod and a slot for coupling to lifting bar engaging pulley assembly and where the a weight support element is a bracket having a sleeve for fitting over weight support guide rod and a slot for coupling to weight engaging pulley assembly. Further, the weightlifting apparatus may include a base coupled to the upright support by the universal joint, wherein a base ring is coupled to the base and a restrictor ring is coupled to the upright support adjacent to the universal joint. The restrictor ring and base ring are positioned above and below the universal joint to limit the allowable horizontal movement of the lifting bar and to keep the upright support in a generally upright position.

DETAILED DESCRIPTION

A weightlifting apparatus 10 is provided for safely performing a weight lifting exercises, such bench press, without a spotter present to provide assistance if the person doing the exercise is unable to complete a lift or losses control of the weight during the lift. Weightlifting apparatus 10 also simulates a free-weight barbell by allowing independent motion of the lifting bar both vertically and horizontally from end to end.

Figure 1A:
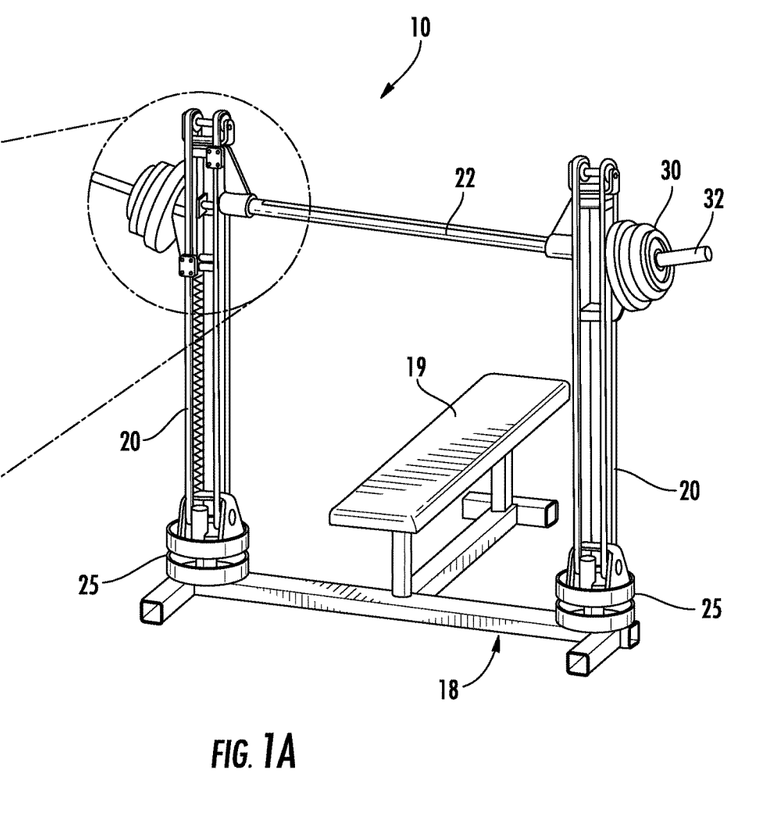
FIG. 1A is a perspective view of a weightlifting apparatus in accordance with an embodiment of the invention and FIG. 1B is an enlarged view of a lifting bar support element and weight support element.
Figure 1B:
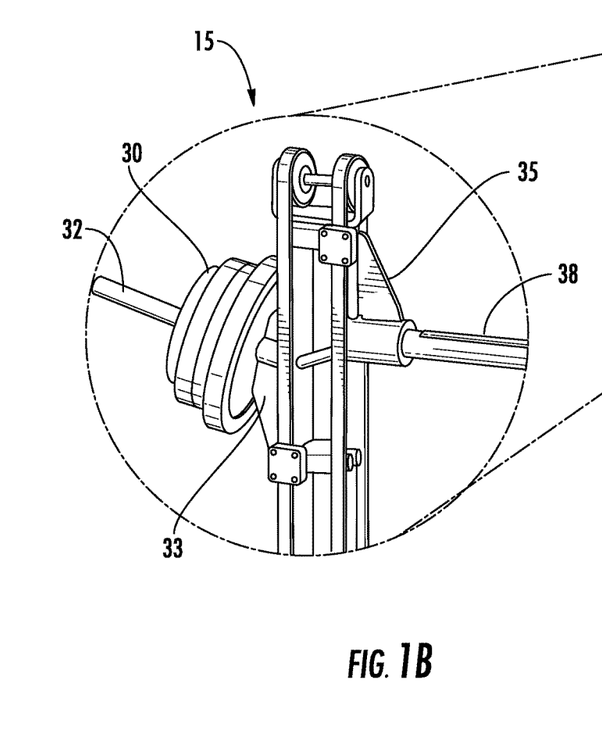

FIG. 1 illustrates weightlifting apparatus 10 in accordance with an embodiment of the invention with an enlarged view of a weightlifting safety mechanism 15. The weightlifting apparatus 10 has a base 18 with a bench 19 and a pair of upright structures, each of which is indicated at 20. A lifting bar 22 is positioned between and coupled to the upright structures 20, Each upright structure 20 includes a pivoting mechanism 25, such as a universal joint. FIG. 1A illustrates weightlifting apparatus 10 in an active position. Weights 30 are positioned on weight mounting posts 32 supported by weight mounting support elements 33. In operation, a user lightly grips lifting bar 22 and moves it into a desired start position. Lifting bar 22 is attached at each end to a lifting bar support element 35 by means of a spherical bearing assembly. This allows the lifting bar to have independent movement at each end and allows the lifting bar to rotate 360 degrees for ideal positioning of the grip rail to hand position. Lifting bar 22 includes a grip rail 38 for engaging weights 30. Lifting bar 22 moves up or down freely if grip rail 38 has not been depressed.

Figure 2:
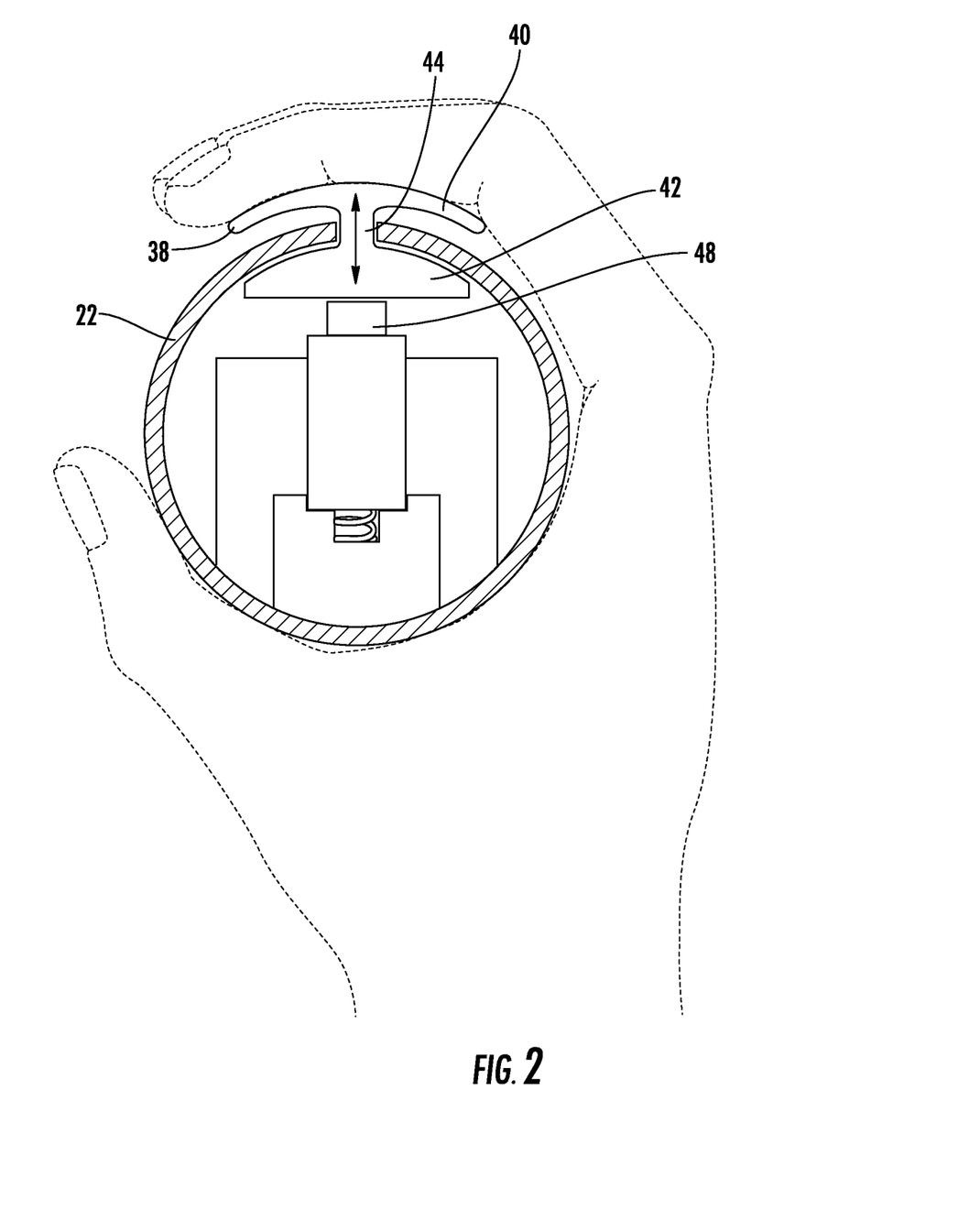
FIG. 2 is a cross sectional view of a lifting bar.
Figure 3:
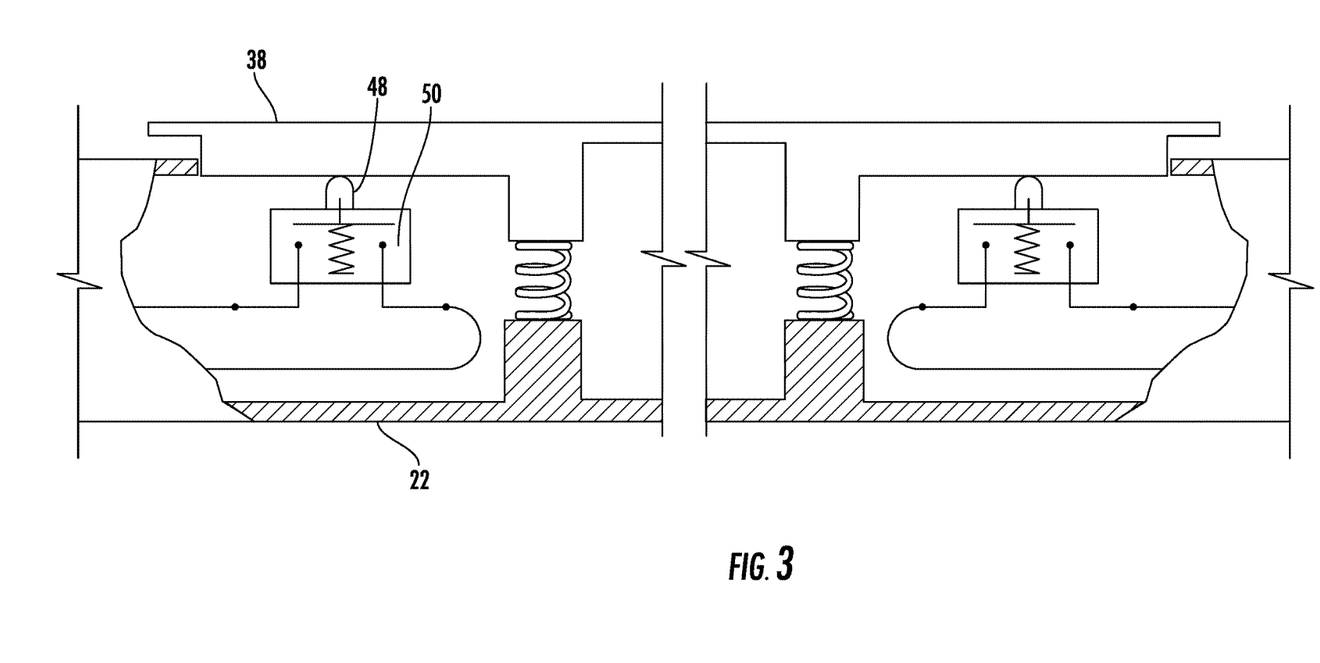
FIG. 3 illustrates a lengthwise cross-sectional view of the lifting bar.

FIG. 2 an end cross-sectional view of lifting bar 22. As shown in FIG. 3, when a user is ready to lift weights 30, the user tightens their grip on lifting bar 22, thereby squeezing grip rail 38 towards the surface of lifting bar 22. Grip rail 38 includes a grip engaging portion 40 and a plunger contacting portion 42 with a neck 44 therebetween. Grip rail 38 fits within a slot or opening in an upper side of lifting bar 22 as shown in FIG. 3. When grip rail is depressed towards the surface of lifting bar 22, plunger contacting portion 42 engages switch plungers 48. Thus, switch contacts 50 are connected and voltage is applied to clutch assembly 55, which connects lift bar 22 to weights 30. As is evident, the lifting bar, which is effectively weightless, can be moved with a partial grip. A tight grip on the bar will depress the grip rail 38 applying pressure to the switch plunger depressing it.

Figure 4:
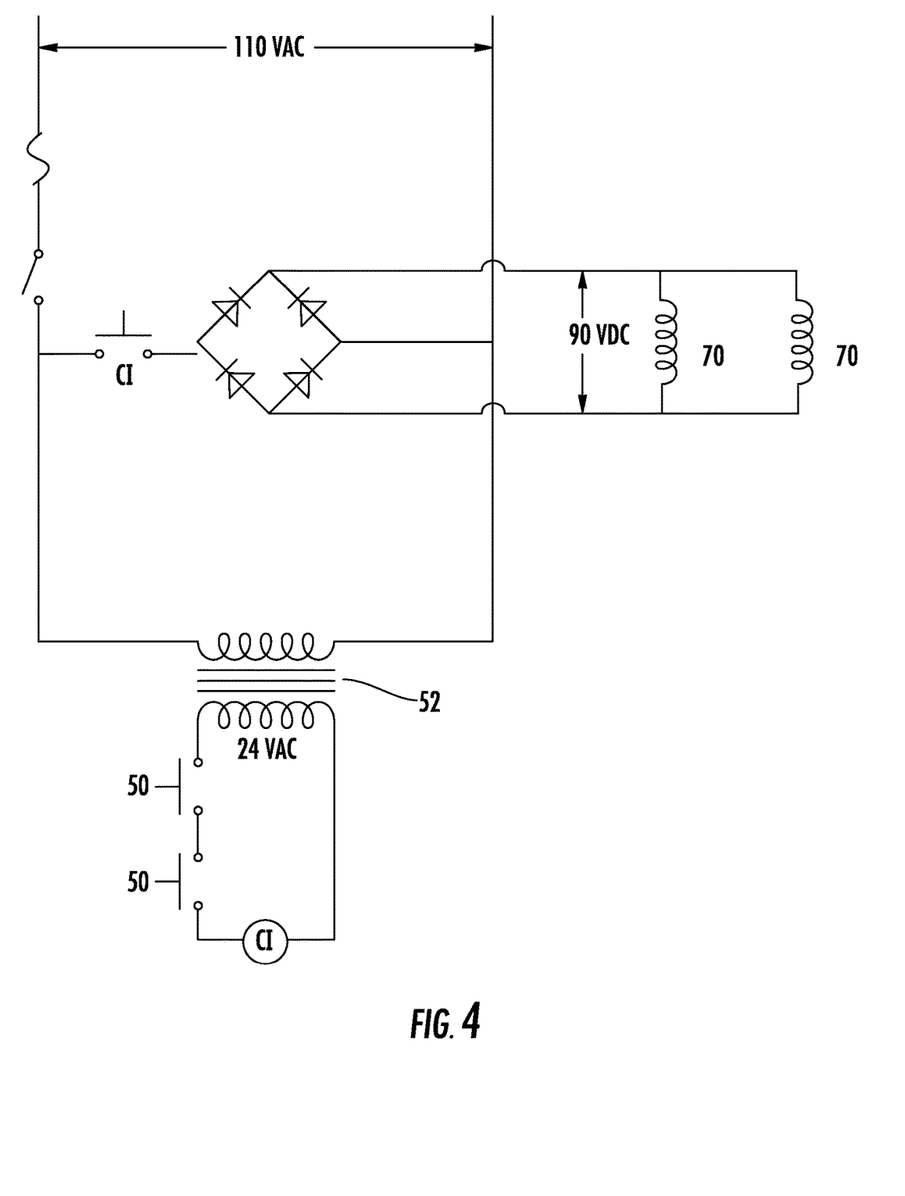
FIG. 4 is a wiring schematic of a safety mechanism for use with the weightlifting assembly.

FIG. 3 illustrates a lengthwise cross-sectional view of lifting bar 22. As shown, when plunger 48 is depressed, electrical contacts within switches 50 at each end of the lifting bar are connected and as illustrated in the wiring schematic of FIG. 4. Connecting switch contacts 50 applies voltage to an electrical relay that applies voltage to clutch coils 70. A stepdown transformer 52 is utilized to keep low voltage to lifting bar area. At this time, lifting bar 22 is effectively attached to the weights simulating a conventional free-weight barbell. When a user relaxes the grip on lifting bar 22, grip rail 38 extends to remove the electrical connection within switches 50. Therefore, the circuit is opened and clutch plates are allowed to separate and the weights are disconnected from lifting bar 22. Additionally, if clutch plates 71 and 72 become mechanically bound and can't separate, lifting bar 22 with the weights still effectively connected would drop down to their original starting position, thereby preventing harm to a user.

If a user is unable to complete a lift or control is lost, relaxing the grip on lifting bar 22 allows grip rail 38 to extend. When grip rail 38 is extended, pressure removed from plungers 48, thereby opening contacts 50 and removing voltage to clutch coils 70. Clutch plates 71 and 72 are then separated and weights are disconnected from lifting bar 22. The weights then drop to their start position. At this point, or if the exercise is complete, the user can move lifting bar 22 up and back to allow ease of exiting from the bench.

Figure 5:
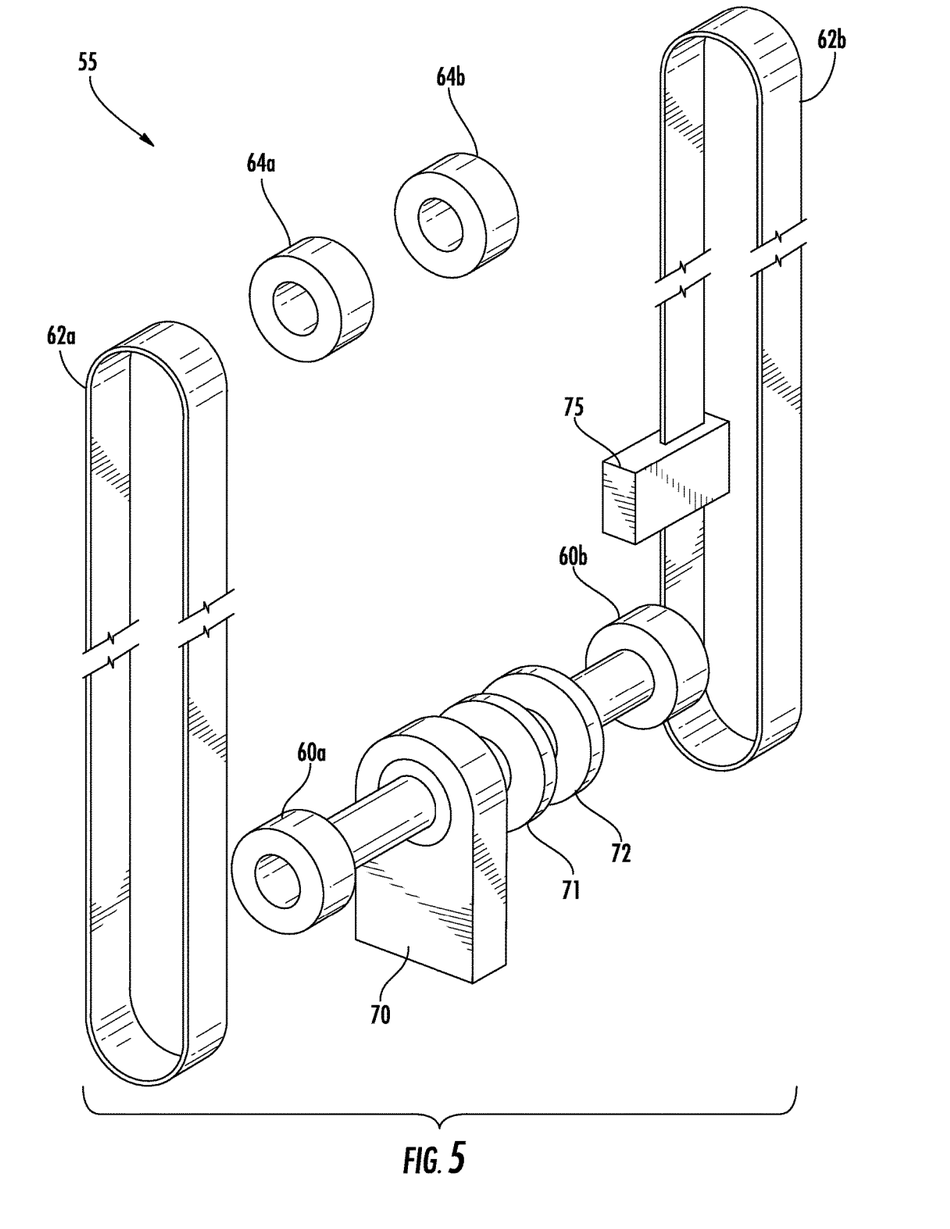
FIG. 5 is an exploded view of an electromagnetic clutch.
Figure 6:
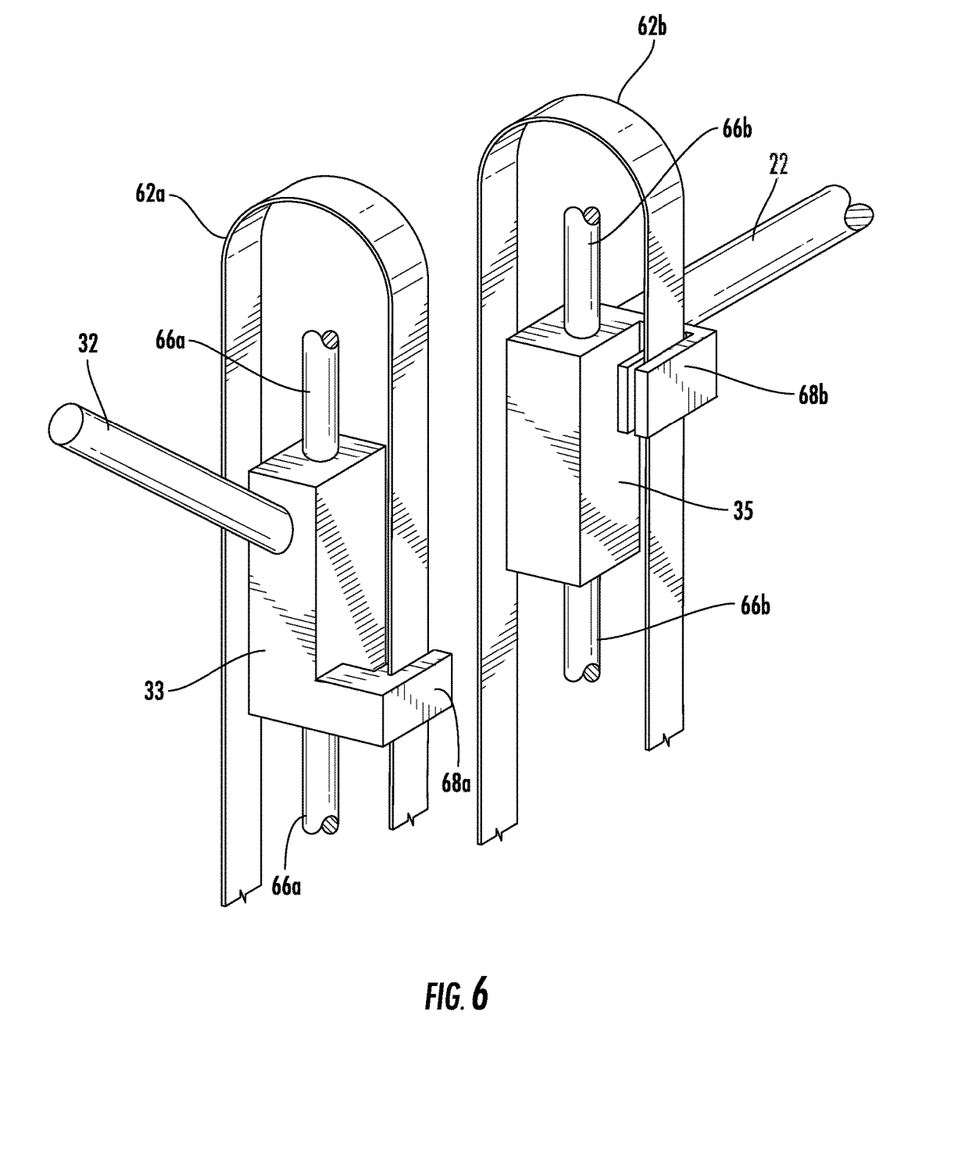
FIG. 6 is a partial view of a pulley system for the weightlifting apparatus.

In the embodiment shown in FIGS. 5-6, clutch assembly 55 is an electro-magnetic clutch. Clutch assembly 55 includes two pulleys 60a and 60b with belts 62a and 62b extending upward to two additional pulleys 64a and 64b at the top of the assembly. Also extending from bottom to top are two sleeves 66a and 66b attached to weight mounting support element 33 and the lifting bar support element 35, respectively. Weight mounting support element 33 includes a receiving slot 68a for coupling to belt 62a and lifting bar support element 35 includes a corresponding receiving slot 68b for coupling to belt 62b.

Clutch assembly 55 includes a coil of wire 70 and two clutch plates 71 and 72. Clutch plate 71 is on the same sleeve as pulley 60a moving its associated belt 62a and support element 33. Clutch plate 71 is on a separate sleeve attached to pulley 60b moving its associated belt 62b and lifting bar support element 35, as illustrated in FIG. 5. In an un-activated position, pulley 60a and belt 62a, which are coupled to weight support element 33 and weights move separately from pulley 60b and belt 62b, which are coupled to lifting bar support element 35 and lifting bar 22. When voltage is applied to clutch coil 70, a magnetic field is created that pulls clutch plates 71 and 72 together such that clutch plates 71 and 72 act as one combined unit. Movement of lifting bar 22 then causes a corresponding movement of weights 30. If the voltage is removed from clutch coil 70, clutch plates 71 and 72 separate and gravity lowers weights 30 and weight support element 33 back to a bottom starting position. Thus, lifting bar 22, being free of weights, can be positioned wherever desired. Lifting bar 22 stays in whatever location it is placed because a matching counter-weight 75 to the weight of the lifting bar bracket and lifting bar is attached to an opposite side of belt 62b, thereby creating a generally weightless lifting bar.

Figure 7A:
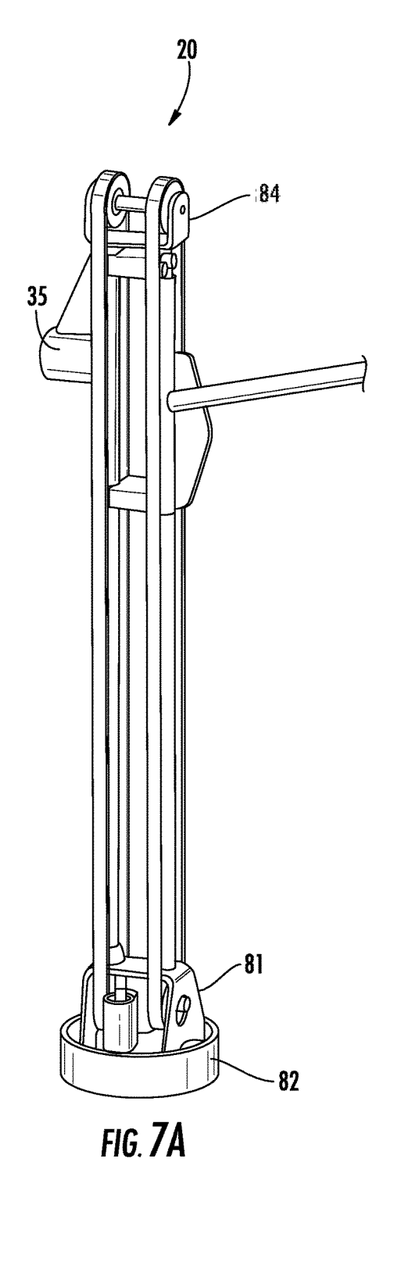
FIGS. 7A and 7B are assembled and exploded views of upright supports of the weightlifting assembly.
Figure 7B:
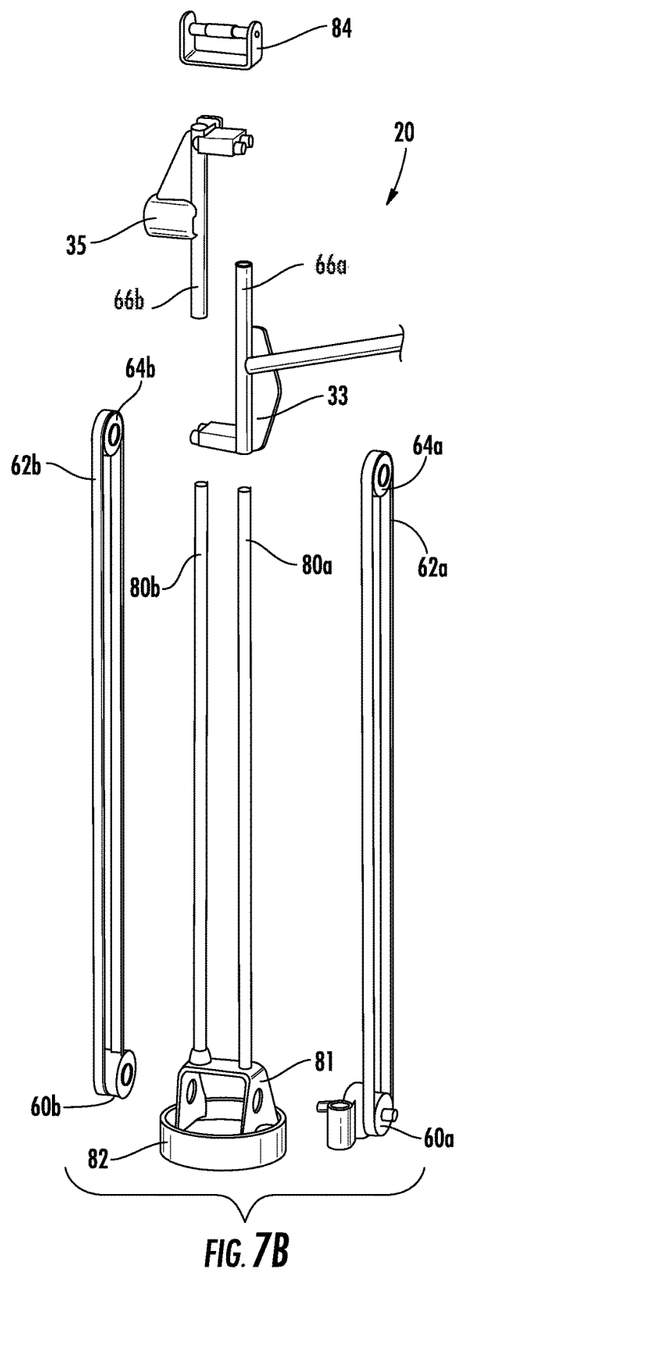

FIGS. 7A and 7B illustrate assembled and exploded views of upright structure 20, one of which is positioned at each end of weightlifting apparatus 10. Each upright structure 20 includes at least two guide rods 80a and 80b. Each guide rod 80a, 80b is attached to a bracket 81 and restrictor ring 82 at a bottom end and wheel mounting bracket 84 at a top end. Lifting bar support element 35, which includes sleeve 66b fits over lifting bar guide rod 80b such that lifting bar support element 35 can slide vertically along guide rod 80b. Similarly, weight mounting support element 33, which includes sleeve 66a, fits over weight support guide rod 80a such that weight mounting support element 33 can slide vertically along weight support guide rod 80a. Belts 62a and 62b are coupled to lower pulleys 60a and 60b and upper pulleys 64a and 64b.

Figure 8A:
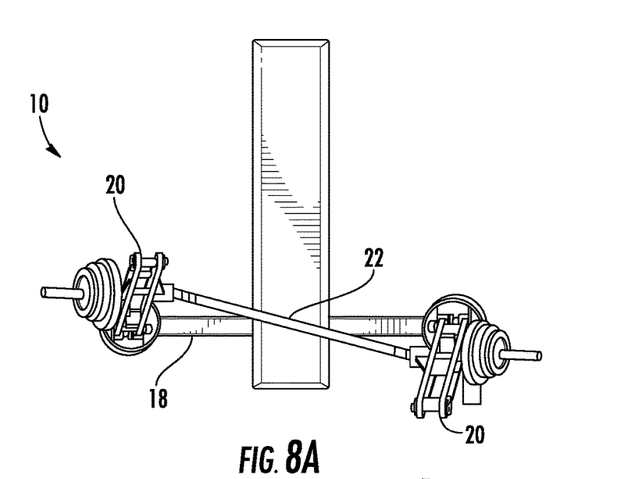
FIGS. 8A-8C illustrate top, back and side views of the weightlifting apparatus with the upright structures in pivoted positions.
Figures 8B, 8C:
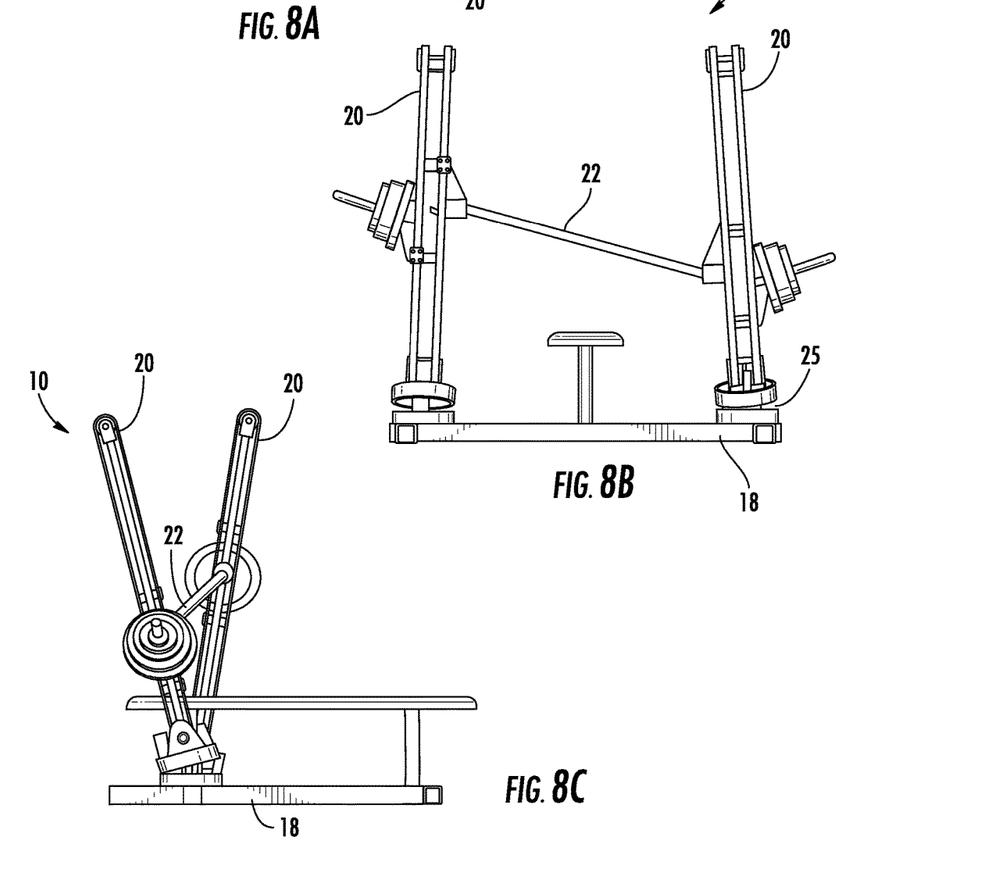

As shown in FIGS. 8A-8C, weightlifting apparatus 10 includes an upright structure 20 on each end supporting lifting bar 22. Upright structures 20 pivot relative to base 18 by way of a pivoting mechanism 25. FIGS. 8A-8C illustrate top, back and side views of weightlifting apparatus 10 with upright structures 20 in pivoted positions. The pivoting movement of upright structures allows lifting bar 22 to move in a manner similar to a free weight barbell.

Figure 9A:
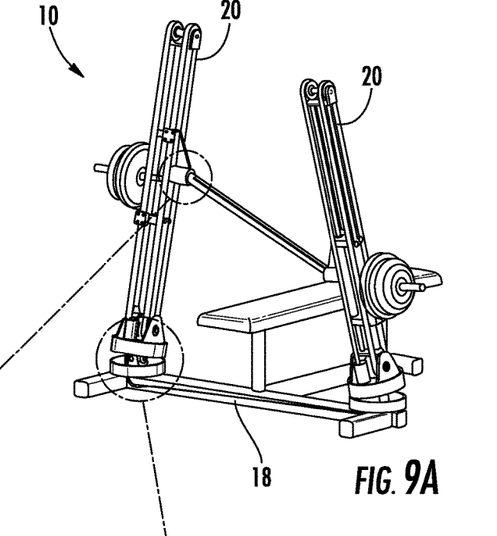
FIG. 9A illustrates the weightlifting apparatus with the upright structures in pivoted positions.
Figure 9B:
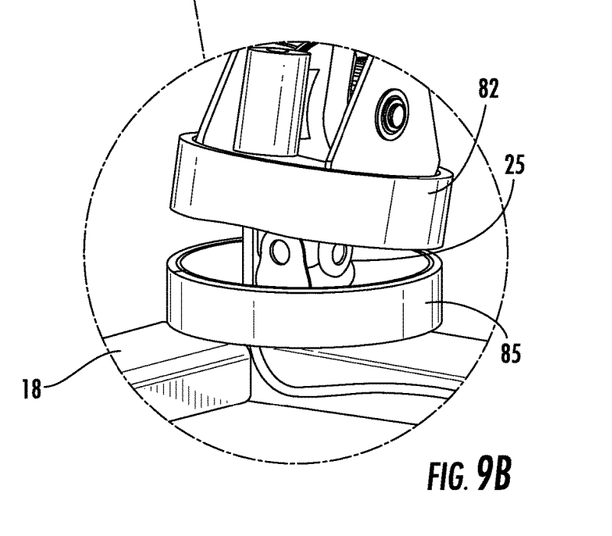
FIGS. 9B and 9C show enlarged views of base and bar pivoting mechanisms.

FIG. 9A illustrates weightlifting apparatus 10 with upright structures 20 in pivoted positions. An enlarged view of pivoting mechanism 25 is shown in FIG. 9B. A restrictor ring 82 is coupled to each upright structure 20. Similarly, a base ring 85 is coupled to each end of base 18. Thus, restrictor ring 82 and base ring 85 are positioned above and below pivoting mechanism 25 to limit the allowable horizontal movement of lifting bar 22 and to keep upright structures 20 in a generally upright position.

Figure 9C:
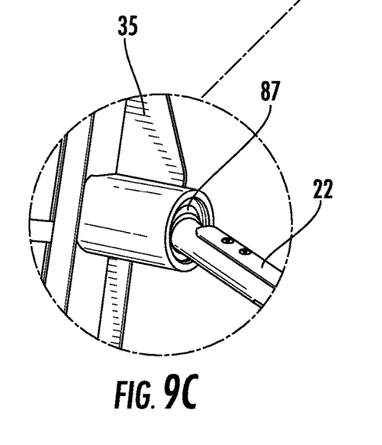

In addition, lifting bar 22 is capable of swiveling or pivoting with respect to lifting bar support element 35. FIG. 9C is an enlarged view of a joint such as a swivel joint 87 which allows for pivoting movement of lifting bar 22 when upright structures 20 pivot from their upright position. The joint may also be a spherical bearing that enables horizontal, vertical and rotational movement of the lifting bar.

Figures 10A, 10B, 10C:
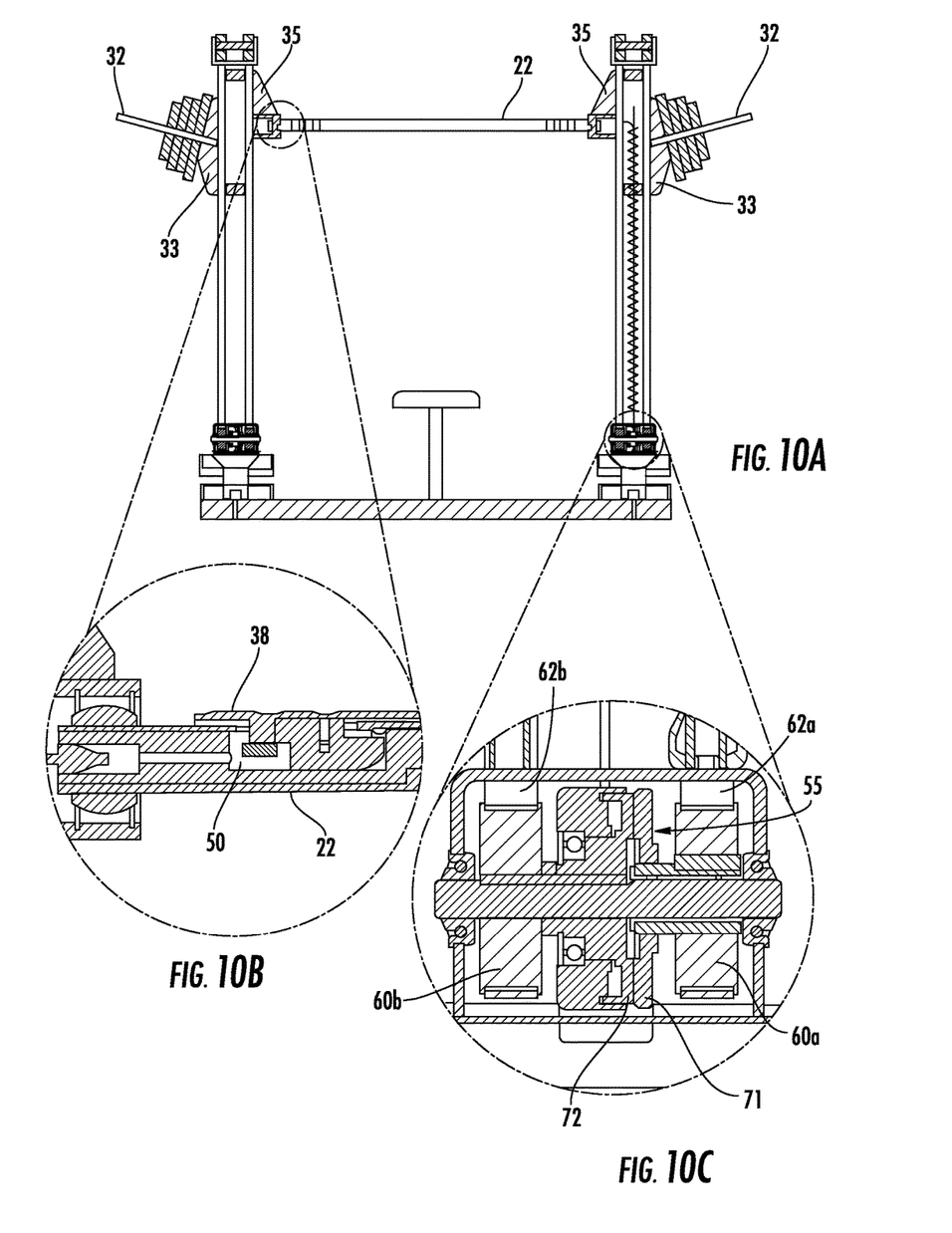
FIG. 10A is a perspective view of the weightlifting apparatus with the weights in an engaged state with enlarged views of a grip rail switch (10B) and clutch assembly (10C).

FIG. 10A illustrates an additional back view of weightlifting apparatus 10 in an engaged position, such as during an active lift. FIG. 10B is a detailed view of grip rail 38 in a depressed position. When grip rail is depressed, switch 50 contacts are closed. A switch 50 is positioned on each end of lifting bar 22. When both switches 50 are activated clutch assemblies 55 are activated. A detailed view of one of clutch assemblies 55 in an activated is shown in FIG. 10C. If one or both of switches 50 are released, both clutch assemblies 55 will be deactivated. Lifting bar 22 is capable of rotating to any position that is comfortable for a user to complete a lift and to locate grip rail 38 at a convenient position. As shown in FIG. 10C, activation of switches 50 causes clutch coil to be activated, thereby forcing clutch plates contact one another. When clutch coil has voltage applied, clutch plates are pulled together and pulleys begin to move simultaneously. Thus, weights being to move with lifting bar.

Figure 11A:
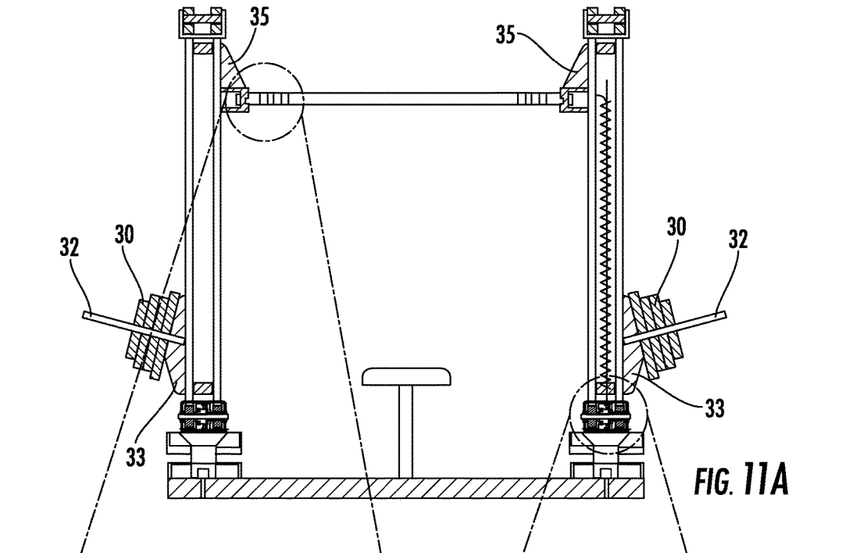
FIG. 11A is a perspective view of the weightlifting apparatus with the weights in a disengaged state with enlarged views of a grip rail switch (11B) and clutch assembly (11C).
Figures 11B, 11C:
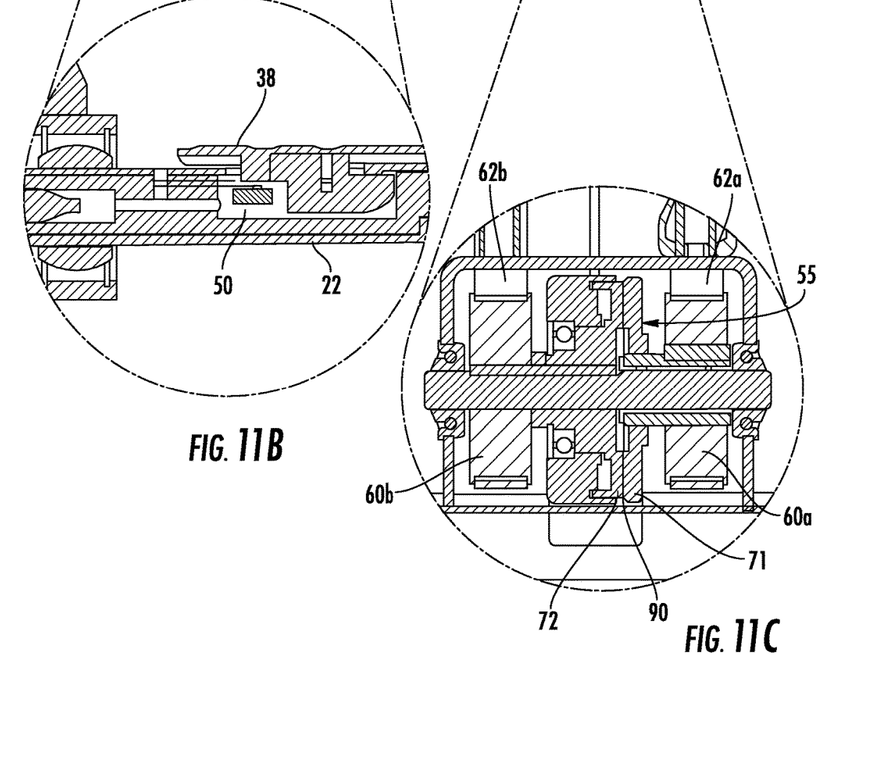

FIG. 11A illustrates a back view of weightlifting apparatus 10 in a disengaged position, such as prior to a lift or during a grip release. FIG. 11B is a detailed view of grip rail 38 in a released position. When grip rail is released, switch 50 contacts are opened. If one or both of switches 50 are released, both clutch assemblies 55 will be deactivated, as shown in FIG. 11C. Deactivation of switches 50 causes clutch coil to be deactivated, thereby separating clutch plates and leaving a gap 90 therebetween. Therefore, pulleys 60a and 60b begin to move independently and weight support elements 33, carrying weights 30 are disengaged from lifting bar 22 drop to a released position as shown in FIG. 11A.

Various changes and modifications may be apparent to those skilled in the art. It is the intent that these changes and modifications are to be encompassed within the spirit of the appended claims and that the invention described herein and shown in the accompanying drawings is illustrative only and not intended to limit the scope of the invention.

The invention claimed is:

1. A weightlifting apparatus having free weight simulation and a safety mechanism, said weightlifting apparatus comprising:
   at least one upright support having a lifting bar engaging pulley assembly and a weight engaging pulley assembly, said upright support including a universal joint for allowing the upright support to pivot;
   a lifting bar support element coupled to the lifting bar engaging pulley assembly;
   a lift bar having an end coupled to the bar engaging pulley assembly, said lifting bar including a grip portion having switch contact disposed therein that is engaged when the grip portion is depressed, said end being coupled to the lifting bar support element with a spherical bearing that enables horizontal, vertical and rotational movement of the lifting bar;
   a weight support element coupled to the weight engaging pulley assembly, said weight support element adapted to hold weights; and
   a clutch assembly for enabling the bar engaging pulley assembly and the weight engaging pulley assembly to move together in unison when a voltage is supplied by engaging the grip portion, wherein disengagement of the grip portion opens the switch contact and causes voltage to be cut off from the clutch assembly, thereby uncoupling the lifting bar engaging pulley assembly and weight engaging pulley assembly and disengaging the weight support element and the lifting bar.

2. The weightlifting apparatus having free weight simulation and a safety mechanism according to claim 1, wherein the clutch assembly includes a clutch coil and a pair of clutch plates that contact to enable the bar engaging pulley assembly and weight engaging pulley assembly to move together in unison and separate to uncouple the lifting bar engaging pulley assembly and weight engaging pulley assembly, thereby disengaging the weight support element and the lifting bar.

3. The weightlifting apparatus having free weight simulation and a safety mechanism according to claim 1, wherein the upright support further includes a lifting bar guide rod and a weight support guide rod.

4. The weightlifting apparatus having free weight simulation and a safety mechanism according to claim 3, wherein the a lifting bar support element includes a sleeve for fitting over lifting bar guide rod and a slot for coupling to lifting bar engaging pulley assembly and wherein the a weight support element includes a sleeve for fitting over weight support guide rod and a slot for coupling to weight engaging pulley assembly.

5. The weightlifting apparatus having free weight simulation and a safety mechanism according to claim 1 further comprising a base coupled to the upright support by the universal joint, a base ring coupled to the base and a restrictor ring coupled to the upright support adjacent to the universal joint, said restrictor ring and base ring being positioned above and below the universal joint to limit the allowable horizontal movement of the lifting bar and to keep the upright support in a generally upright position.

6. A weightlifting apparatus with free weight simulation comprising:
   at least one upright support having a bar engaging pulley assembly and a weight engaging pulley assembly, said upright support including a universal joint for allowing the upright support to pivot;
   a lifting bar support element coupled to the lifting bar engaging pulley assembly;
   a lift bar having an end coupled to the bar engaging pulley assembly, said end being coupled to the lifting bar support element with a spherical bearing that enables horizontal, vertical and rotational movement of the lifting bar; and
   a weight support element coupled to the weight engaging pulley assembly, said weight support element adapted to hold weights.

7. The weightlifting apparatus having free weight simulation according to claim 6, wherein the upright support further includes a lifting bar guide rod and a weight support guide rod.

8. The weightlifting apparatus having free weight simulation according to claim 7, wherein the a lifting bar support element includes a sleeve for fitting over lifting bar guide rod and a slot for coupling to lifting bar engaging pulley assembly and wherein the a weight support element includes a sleeve for fitting over weight support guide rod and a slot for coupling to weight engaging pulley assembly.

9. The weightlifting apparatus having free weight simulation according to claim 6 further comprising a base coupled to the upright support by the universal joint, a base ring coupled to the base and a restrictor ring coupled to the upright support adjacent to the universal joint, said restrictor ring and base ring being positioned above and below the universal joint to limit the allowable horizontal movement of the lifting bar and to keep the upright support in a generally upright position.

10. A weightlifting apparatus having a safety mechanism, said weightlifting apparatus comprising:
    at least one upright support having a bar engaging pulley assembly and a weight engaging pulley assembly;
    a lifting bar support element coupled to the lifting bar engaging pulley assembly;
    a lift bar having an end coupled to the bar engaging pulley assembly, said lifting bar including a grip portion having switch contact disposed therein that is engaged when the grip portion is depressed;
    a weight support element coupled to the weight engaging pulley assembly, said weight support element adapted to hold weights; and
    a clutch assembly for enabling the bar engaging pulley assembly and a weight engaging pulley assembly to move together in unison when a voltage is supplied by engaging the grip portion, wherein disengagement of the grip portion opens the switch contact and causes voltage to be cut off from the clutch assembly, thereby uncoupling the lifting bar engaging pulley assembly and weight engaging pulley assembly and disengaging the weight support element and the lifting bar.

11. The weightlifting apparatus having free weight simulation and a safety mechanism according to claim 10, wherein the clutch assembly includes a clutch coil and a pair of clutch plates that contact to enable the bar engaging pulley assembly and weight engaging pulley assembly to move together in unison and separate to uncouple the lifting bar engaging pulley assembly and weight engaging pulley assembly, thereby disengaging the weight support element and the lifting bar.

* * * * *